US012268328B2

(12) United States Patent
Bruzzese

(10) Patent No.: US 12,268,328 B2
(45) Date of Patent: Apr. 8, 2025

(54) CONTINUOUS-FLOW ELECTROMAGNETIC-INDUCTION FLUID HEATER IN A BEVERAGE VENDING MACHINE

(71) Applicant: RHEAVENDORS SERVICES S.P.A., Como (IT)

(72) Inventor: Fabio Bruzzese, Como (IT)

(73) Assignee: RHEAVENDORS SERVICES S.P.A. (IT)

( * ) Notice: Subject to any disclaimer, the term of this patent is extended or adjusted under 35 U.S.C. 154(b) by 0 days.

(21) Appl. No.: 17/620,024

(22) PCT Filed: Jun. 18, 2020

(86) PCT No.: PCT/IB2020/055725
§ 371 (c)(1),
(2) Date: Dec. 16, 2021

(87) PCT Pub. No.: WO2020/255026
PCT Pub. Date: Dec. 24, 2020

(65) Prior Publication Data
US 2022/0265084 A1    Aug. 25, 2022

(30) Foreign Application Priority Data
Jun. 18, 2019   (IT) .................. 102019000009381

(51) Int. Cl.
*A47J 31/54*   (2006.01)
*H05B 6/10*   (2006.01)
*H05B 6/36*   (2006.01)

(52) U.S. Cl.
CPC ............. *A47J 31/542* (2013.01); *H05B 6/10* (2013.01); *H05B 6/36* (2013.01)

(58) Field of Classification Search
CPC .... A47J 31/542; A47J 31/547; A47J 31/4446; A47J 31/445; H05B 6/10; H05B 6/36;
(Continued)

(56) References Cited

U.S. PATENT DOCUMENTS

| 5,216,215 A | 6/1993 | Walker et al. |
| 2010/0310241 A1* | 12/2010 | Hollis .................. F24H 1/142 392/488 |

(Continued)

FOREIGN PATENT DOCUMENTS

| CN | 1056928 A | 12/1991 |
| CN | 2691207 Y | 4/2005 |

(Continued)

OTHER PUBLICATIONS

Examination Report issued in counterpart New Zealand Application No. 783726 on Nov. 17, 2023.
(Continued)

*Primary Examiner* — Steven W Crabb
*Assistant Examiner* — Fahmida Ferdousi
(74) *Attorney, Agent, or Firm* — The Belles Group, P.C.

(57) ABSTRACT

A continuous-flow electromagnetic-induction fluid heater in a beverage vending machine. The continuous-flow electromagnetic-induction fluid heater comprises a tubular body internally defining at least one channel and including at least one inlet opening and one outlet opening; a heating element; and an electric winding wound directly in contact around an external surface of the tubular body and which can be electrically powered to generate an electromagnetic induction field and heat, in this manner, the heating element by the effect of the electromagnetic induction field. The continuous-flow electromagnetic-induction fluid heater further comprises an upstream fluid baffle, housed within the channel in a position fluidically downstream of the inlet opening (Continued)

and fluidically upstream of the heating element, and is shaped so as to reduce the hydrodynamic drag on said fluid between the inlet opening and the heating element.

11 Claims, 4 Drawing Sheets

(58) Field of Classification Search
CPC ...... H05B 2206/024; F24F 1/10; F24H 1/103; F24H 1/202; F24H 9/1818; F24H 2250/08
See application file for complete search history.

(56) References Cited

U.S. PATENT DOCUMENTS

| | | | | |
|---|---|---|---|---|
| 2015/0226452 | A1* | 8/2015 | Adobati | F24H 9/0021 392/485 |
| 2017/0138633 | A1* | 5/2017 | Hermida Domínguez | F24H 1/142 |
| 2018/0142918 | A1* | 5/2018 | Frechette | F28F 9/0229 |

FOREIGN PATENT DOCUMENTS

| | | | | |
|---|---|---|---|---|
| CN | 1724954 | A | 1/2006 | |
| CN | 1805628 | A | 7/2006 | |
| CN | 2850190 | Y | 12/2006 | |
| CN | 202153053 | U | 2/2012 | |
| CN | 102937329 | A1 | 2/2013 | |
| CN | 203010898 | U | 6/2013 | |
| CN | 203704310 | U | 7/2014 | |
| CN | 203893415 | U | 10/2014 | |
| CN | 205448332 | U | 8/2016 | |
| CN | 106322743 | A | 1/2017 | |
| CN | 206237623 | U | 6/2017 | |
| CN | 107036293 | A * | 8/2017 | |
| CN | 107647785 | A | 2/2018 | |
| CN | 207035468 | U | 2/2018 | |
| CN | 109556277 | A | 4/2019 | |
| DE | 202013102613 | U | 8/2013 | |
| DE | 202013102613 | U1 | 8/2013 | |
| EP | 2194331 | A2 * | 6/2010 | ............ F24H 1/101 |
| EP | 2868242 | A | 5/2015 | |
| JP | 2006228438 | A | 8/2006 | |
| JP | 2011017496 | A | 1/2011 | |
| WO | 2012034450 | A1 | 3/2012 | |
| WO | 2016016225 | A1 | 2/2016 | |
| WO | 2017003402 | A1 | 1/2017 | |

OTHER PUBLICATIONS

Examination Report issued in corresponding New Zealand Application No. 783726 on May 28, 2024.
Office Action issued in corresponding Chinese Patent Application No. 202080044889.7 on Dec. 4, 2023.

* cited by examiner

CONTINUOUS-FLOW ELECTROMAGNETIC-INDUCTION FLUID HEATER IN A BEVERAGE VENDING MACHINE

CROSS-REFERENCE TO RELATED PATENT APPLICATIONS

This patent application is a U.S. national stage application under 35 U.S.C. § 371 of PCT Application No. PCT/IB2020/055725, filed on Jun. 18, 2020, which claims priority from Italian patent application no. 102019000009381 filed on Jun. 18, 2019.

TECHNICAL FIELD

The present invention relates in general to the field of beverage vending machines, and in particular to a continuous-flow electromagnetic-induction fluid heater for heating a fluid, in particular water, milk, air or the like, in a beverage vending machine, in order to prepare hot beverages from an anhydrous material, for instance coffee, tea, hot chocolate or the like.

BACKGROUND ART

Beverage vending machines, in particular for preparing hot beverages from an anhydrous material, for instance coffee, tea, hot chocolate or the like, are known.

Such beverage vending machines are provided with one or more heaters configured to heat the water, for instance boilers or kettles. Known heaters generally comprise a heating element made of a resistive material and apt to heat the water held inside a tank or container of the machine.

More specifically, the heating element is permanently immersed in the water held in the container; a potential difference is applied to the ends of the heating element. An electric current is thus generated within the latter which, by the Joule effect, dissipates energy in the form of heat, thus heating the water by conduction.

It is thus necessary to maintain the water held in the container at a desired temperature so as to guarantee a rapid dispensing of the beverage.

It follows that, if the machine remains inactive for long periods, a considerable amount of energy will be consumed to maintain the water inside the container at the desired temperature (usually above 85° C.).

Moreover, the heaters mentioned above are of the accumulator type, i.e. of the type in which a given volume of water is held in the container and in which the water is heated and maintained at the desired temperature; when the dispensation of a certain volume of hot water is requested to prepare a corresponding beverage, the hot water drawn from the container is replenished with water at room temperature. The water in the container thus needs to be heated and raised again to the desired temperature, so as to guarantee that the next dispensation occurs at the desired temperature.

In the latter case, a waiting period is thus necessary for re-heating the water, the duration of which depends on the quantity of hot water dispensed during one or more previous dispensations.

Besides temperature, an important specification to be met is the flow rate of the hot water dispensed, which depends above all on the type of beverage to be prepared; for instance, in the case of beverages produced by means of soluble substances, a considerable (at least 10 cc/s) flow rate of hot water is required. With a high flow rate of dispensed hot water, there will be a rapid drop in the temperature of the water held in the container, resulting in long waiting times for a subsequent dispensation or in an obtained beverage in which the soluble substance can form clumps.

CN-A-107647785 and WO-A-2016016225 describe two examples of continuous-flow water heaters for heating water in beverage vending machine.

The problems described above relating to the heating of the water in beverage vending machines stem from the thermal inertia with which a given mass of water heats up.

In order to remedy these technical drawbacks, solutions which exploit the phenomenon of electromagnetic induction for heating the water are known.

In particular, continuous-flow water heaters are known which exploit the electromagnetic induction for generating parasitic currents within a duct made of an electrically conductive material inside which the water to be heated flows. The parasitic currents dissipate energy, by the Joule effect, in the form of heat, thus heating the duct and, consequently, the water that flows in contact with the same.

Electromagnetic induction heaters are known to be particularly advantageous inasmuch as they allow a rapid heating of the water.

EP-A-2868242, of the present Applicant, describes a heater comprising a metal duct wound in the shape of a spiral and housed in a cavity of a spool made of an electrically insulating material and on which a winding of electromagnetic induction is wound.

The winding is supplied with alternating electric current which generates, by electromagnetic induction, parasitic currents which heat, by the Joule effect, the spiral metal duct and thus the water which flows inside the same.

The spool is attached to the support structure of the machine, while the metal duct has no mechanical attachments with the spool, being simply supported by the hydraulic circuit to which it is connected by means of simple push-in fittings.

More specifically, the metal duct and the spool are separated radially by a free space (air gap).

In this way, the maintenance of the heater and, in particular, the replacement of the metal duct is easier, more economical and simplified.

DISCLOSURE OF INVENTION

Although the heater of the type described above represents a functionally viable solution for heating the water in beverage vending machines, the Applicant has had the opportunity to verify that the known heaters are susceptible of further improvement, in particular with respect to the overall hydrodynamic efficiency of the heater.

The object of the present invention is to realize a continuous-flow electromagnetic-induction fluid heater, which is very reliable and of limited cost, and which makes it possible to satisfy the requirement specified above in connection with the known heaters.

According to the invention, this object is achieved by a continuous-flow electromagnetic-induction fluid heater and by a vending machine for preparing hot beverages comprising such a continuous-flow electromagnetic-induction fluid heater as claimed in the attached claims.

BEST MODE FOR CARRYING OUT THE INVENTION

The present invention will be described in the following with reference to water heating without relinquishing any generality as a result, as it can also be used to heat other types of fluids utilized in beverage vending machines, in particular liquid milk or air used for emulsifying the liquid milk or fluids other than water.

Figure 1:
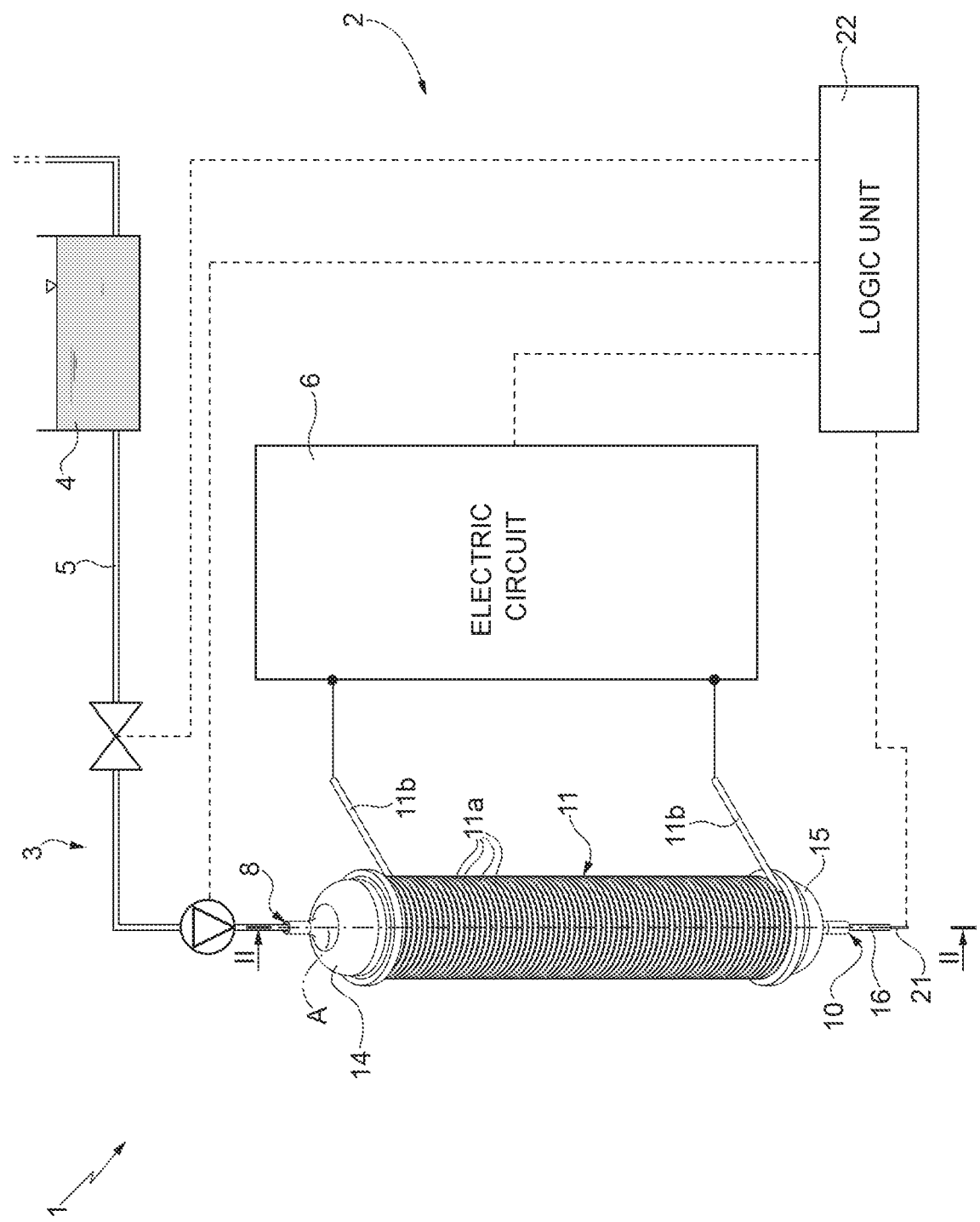
FIG. 1 is a schematic perspective view, with parts removed for clarity, of a supply and heating assembly comprising a heater realized in accordance with a first preferred embodiment of the present invention.
Figure 2:
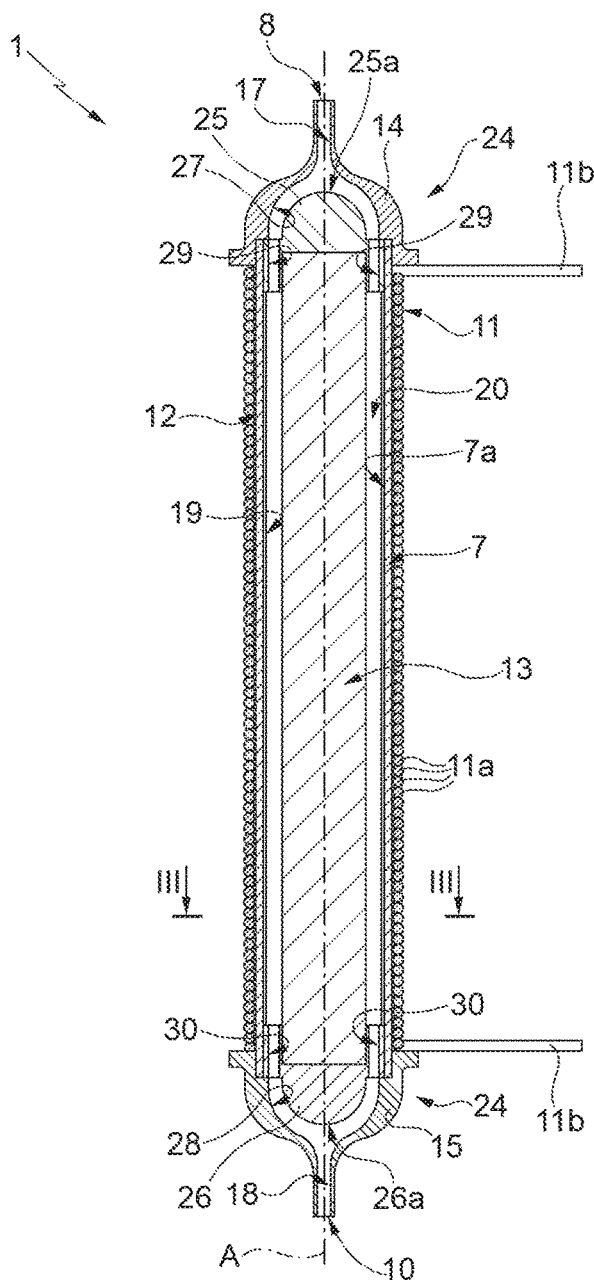
FIG. 2 shows, on an enlarged scale and with parts removed for clarity, an axial section along the line II-II shown in FIG. 1.
Figure 3:
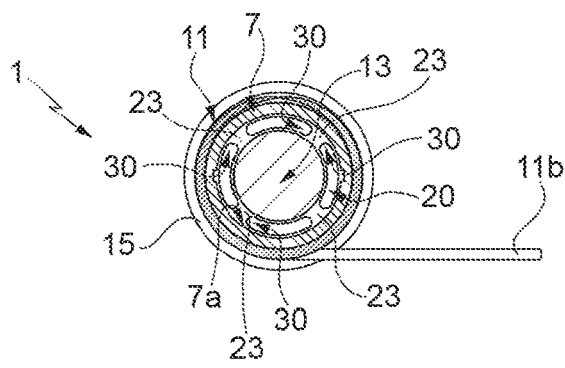
FIG. 3 shows a cross-section along the line III-III shown in FIG. 2.

With reference to FIGS. 1 to 3, a continuous-flow electromagnetic-induction fluid heater configured to heat a fluid, in particular water, in a beverage vending machine (not shown), in particular for preparing hot beverages from an anhydrous material, for instance coffee, tea, hot chocolate or the like, is indicated as a whole by 1.

In particular, the heater 1 is part of a supply and heating assembly 2 of the aforementioned beverage vending machine, which comprises:

- a hydraulic supply circuit 3 (shown schematically in FIG. 1) provided with a container 4 containing water, preferably water at room temperature, and configured to convey a flow of water from the container 4 towards the heating device 1 by means of a tube 5; and
- an electric circuit 6 (shown schematically in FIG. 1), the function of which will be clarified in the following.

In detail, the heater 1 is connected to the electric circuit 6 and is fluidically connected to the hydraulic circuit 3.

As shown in FIG. 2, the heater 1 comprises a tubular body 7 internally defining a flow channel 7a for the water. The tubular body 7 is thus hollow, has a longitudinal axis A and comprises an inlet opening 8 through which the water to be heated conveyed by the hydraulic circuit 3 is fed, in use, to the channel 7a, and an outlet opening 10 through which the heated water flows out, in use, from the channel 7a.

According to this preferred and non-limiting embodiment, the tubular body 7 is substantially rectilinear, while the channel 7a is obtained coaxially to the axis A and has a substantially circular cross-section.

According to an alternative embodiment not shown, the tubular body 7 and/or the channel 7a may have a non-rectilinear configuration, for instance including one or more curved sections; moreover, the channel 7a may have a non-circular cross-section (for instance elliptical, oval, square, rectangular, polygonal, etc.).

The tubular body 7 is attached to an internal support structure (not shown) of the machine, in a known manner not described in detail.

In particular, the heater 1 comprises a first shaped upper end portion 14 and a second shaped lower end portion 15, arranged on axially opposite sides of the tubular body 7, fixed to the tubular body 7 and adapted to be coupled (in particular, mounted) to the internal support structure of the machine.

More particularly, the shaped portion 14 and the shaped portion 15 are arranged coaxially to the axis A, have a substantially dome shape and define respective axial closing elements of the tubular body 7.

In one embodiment, the shaped portion 14 and the shaped portion 15 are coupled to the tubular body 7 in a removable manner, for instance by means of a threaded coupling.

As shown in FIGS. 1 and 2, the inlet opening 8 and the outlet opening 10 are defined by respective hollow protuberances extending axially from the shaped portion 14 and from the shaped portion 15, respectively. In particular, these protuberances and, consequently, the inlet opening 8 and the outlet opening 10, are arranged coaxially to the axis A.

In detail, the axial protuberance of the shaped portion 14 defines internally a passage 17 which fluidically connects the inlet opening 8 to the channel 7a, thus permitting the water to flow into the channel 7a.

Similarly, the axial protuberance of the shaped portion 15 defines internally a passage 18 which fluidically connects the channel 7a to the outlet opening 10, thus permitting the water to flow out of the tubular body 7.

In view of the foregoing, the inlet opening 8 and the outlet opening 10 are arranged at respective opposite axial ends of the tubular body 7.

In the example shown, the outlet opening 10 is fluidically connected to an outlet tube 16 (FIG. 1). This outlet tube 16 is configured to conduct the heated water from the heating device 1 to a beverage production chamber (not shown), where the heated water laps the anhydrous material, generally contained in a capsule pierced beforehand. The thus obtained beverage is then conveyed from the production chamber to a dispenser (also not shown), by means of which it is discharged from the machine.

The heater 1 further comprises a winding 11 defined by a plurality of concentric spirals 11a wound directly in contact onto an external surface 12 of the tubular body 7.

In detail, the winding 11 is configured to be supplied with an alternating electric current at a given oscillation frequency and to generate, in this manner, an electromagnetic induction field.

In greater detail, the electric circuit 6 applies, in use, an alternating voltage to respective ends 11b of the winding 11, thus generating the aforementioned alternating electric current and the aforementioned electromagnetic induction field.

Preferably, the tubular body 7 is made of a material having zero magnetic susceptibility.

In this way, the tubular body 7 interacts with the electromagnetic induction field generated by the winding 11 to a minimal extent or essentially not at all, thus preventing a disturbance of the latter.

The heater 1 further comprises a heating element 13, which is arranged inside the channel 7a so as to be lapped, in use, by the flow of water flowing inside said channel 7a and which can be activated, in use, by means of the electromagnetic induction field generated by the winding 11.

Specifically, by supplying the winding 11 with alternating electric current, an alternating electromagnetic induction field is generated, the flux lines of which meet inside the channel 7a and, in particular, pass through the heating element 13. According to Faraday's law, the variation in the resulting electromagnetic induction field flux generates parasitic currents inside the heating element 13, which heat the heating element 13 by the Joule effect.

The heating element 13 is conveniently made of a ferromagnetic material. This way, the lines of the electromagnetic induction field are closer together inside the heating element 13, optimizing the generation of the parasitic currents, and are not dissipated inside the tubular body 7.

In use, the water that flows inside the channel 7a laps the heating element 13 and is thus heated by means of a heat transfer by conduction.

As shown in FIG. 2, the heating element 13 is radially spaced from the tubular body 7, more precisely from a rectilinear section 19 of the channel 7a, by means of a gap 20, inside of which the water flow, in use, flows.

Specifically, the heating element 13 extends axially inside the channel 7a, substantially from the shaped portion 14 to the shaped portion 15 without ever contacting the rectilinear section 19 of the channel 7a. More specifically, the heating element 13 is coupled to the tubular body 7 by means of a plurality of connecting portions 23 (FIG. 3).

According to this preferred and non-limiting embodiment, the heating element 13 has a substantially circular cross-section and is housed inside the channel 7a coaxially to the axis A.

Accordingly, the gap 20 has a substantially annular cross-section.

According to an alternative embodiment not shown, the heating element 13 may have a non-circular cross-section, for instance elliptical, oval, square, rectangular, polygonal, etc.

In the example shown in FIGS. 2 and 3, the heating element 13 comprises, in particular is constituted by, a single bar element.

As shown in FIG. 1, the supply and heating assembly 2 further comprises a temperature sensor 21 configured to measure the temperature of the water at the outlet opening 10.

In particular, the sensor 21 is arranged, at least partially, inside the passage 18 of the shaped portion 15 and is thus configured to measure, with an acceptable degree of approximation, the temperature of the water at the outlet opening 10.

The assembly 2 further comprises a logic unit 22 configured to obtain the temperature values measured by the sensor 21.

The logic unit 22 is also configured to control the activation and the deactivation of the electric circuit 6, as well as to control the oscillation frequency of the alternating voltage applied by the electric circuit 6 to the winding 11.

In use, based on the temperature value of the outgoing water measured by the sensor 21, the logic unit 22 adjusts the oscillation frequency and thus the electric power output by the electric circuit 6. It is indeed known that a greater temperature corresponds to a greater electric power, as a result of the greater heat produced due to the Joule effect by the heating element 13.

In this way, the logic unit 22 controls the variation of the temperature of the outgoing water.

Moreover, the heater 1 is advantageously provided with baffle means 24 for deflecting the flow of water, housed inside the channel 7a and comprising:
  an upstream baffle, or distribution, element 25, coupled to the heating element 13, in particular mounted to a first end portion of the heating element 13 positioned at the inlet opening 8, and arranged in a position fluidically downstream of the inlet opening 8 and of the corresponding passage 17 and fluidically upstream of the heating element 13; and
  a downstream baffle, or distribution, element 26, coupled to the heating element 13, in particular mounted to a second end portion of the heating element 13, opposite the first end portion and positioned at the outlet opening 10, and arranged in a position fluidically downstream of the heating element 13 and fluidically upstream of the outlet opening 10 and of the corresponding passage 18.

In particular, the flow of water to be heated conveyed from the tube 5 and flowing, in use, into the channel 7a via the opening 8 comes into contact with the upstream baffle 25 before coming into contact with the heating element 13.

Subsequently, the flow of heated water comes into contact with the downstream baffle 26 before leaving the channel 7a via the outlet opening 10.

In this way, there is less hydrodynamic drag compared to the case where the heating element is not provided with a baffle. Simultaneously, there is a decrease in the total pressure drop.

Conveniently, the upstream baffle 25 and the downstream baffle 26 have a substantially dome shape, so as to avoid a harsh and sudden deflection of the water flow inside the channel 7a and facilitate a more gentle deflection of the same.

The upstream baffle 25 and the downstream baffle 26 are conveniently arranged coaxially to the axis A, and thus to the inlet opening 8 and to the outlet opening 10. In this way, the water flow is deflected as uniformly as possible towards the rectilinear section 19 of the channel 7a.

As shown in FIG. 2, the shaped portion 14 defines internally a shaped section 27 of the channel 7a, arranged fluidically downstream of the inlet opening 8, in particular of the passage 17, and fluidic ally upstream of the heating element 13, in particular of the rectilinear section 19.

Specifically, the shaped section 27 faces, at least partly, the upstream baffle 25, in particular an external surface 25a of the upstream baffle 25, and has a profile that follows (or retraces), at least partially, this external surface 25a.

In this way, the flow of water flowing, in use, inside the shaped section 27 of the channel 7a follows a curved and gentle trajectory, i.e. one without sudden deflections and sharp curves. This contributes to a further limitation of pressure losses within the channel 7a.

In the same manner, the shaped portion 15 defines internally a shaped section 28 of the channel 7a, arranged fluidically downstream of the heating element 13, in particular of the rectilinear section 19, and fluidically upstream of the outlet opening 10, in particular of the passage 18.

Specifically, the shaped section 28 faces, at least partly, the downstream baffle 26, in particular an external surface 26a of the downstream baffle 26, and has a profile that follows (or retraces), at least partially, this external surface 26a. In this way, the flow of water flowing, in use, inside the shaped section 28 of the channel 7a follows a curved and gentle trajectory, i.e. one without sudden deflections and sharp curves. This contributes to a further limitation of pressure drop within the channel 7a.

Moreover, as shown in particular in FIGS. 2 and 3, the tubular body 7 comprises first feeding channels 29, in the specific example four feeding channels 29, arranged fluidically downstream of the upstream baffle 25, connecting the shaped section 27 fluidically to the rectilinear section 19 and adapted to distribute the water flow uniformly around the heating element 13. In this way, it is possible to achieve a uniformity of the water flow by preventing the generation of areas within which water may become stagnant, and thus avoiding unevenness in the heating of the same.

According to this second preferred and non-limiting embodiment, the feeding channels 29 are distributed axial-symmetrically with respect to the axis A, i.e. are angularly equispaced around this axis A.

The tubular body 7 further comprises second feeding channels 30, in the specific example four feeding channels 30, arranged fluidically upstream of the downstream baffle 26, connecting the rectilinear section 19 fluidically to the shaped section 28 and apt to conduct uniformly, i.e. distribute uniformly, the flow of water around the downstream baffle 26.

This last expedient contributes to a further reduction of the overall hydrodynamic drag within the heating device 1.

The operation of the heater 1 according to the present invention will be described in the following, with particular reference to an initial condition in which the water at room temperature is inside the container 4.

In this condition, when a user orders the dispensing of a beverage, the logic unit 22 allows, by means of a system of valves and pumps of a known type (shown schematically in FIG. 1), the flow of water to be heated through the inlet opening 8 and the passage 17 inside the tubular body 7.

Simultaneously, the logic unit 22 controls the activation of the electric circuit 6, which applies an alternating voltage at a given frequency to the ends 11b of the winding 11, thus generating an alternating electric current, which in turn generates the aforementioned electromagnetic induction field.

As described above, this field causes the heating of the heating element 13, which heats the water flowing inside the channel 7a and lapping said heating element 13.

When the heated water flows through the passage 18, the sensor 21 measures its temperature and sends the measured value to the logic unit 21. In this way, a closed-loop control of the measured temperature is achieved.

The heated water is then conveyed by means of the tube 16 to the chamber for producing the selected beverage.

Figure 4:
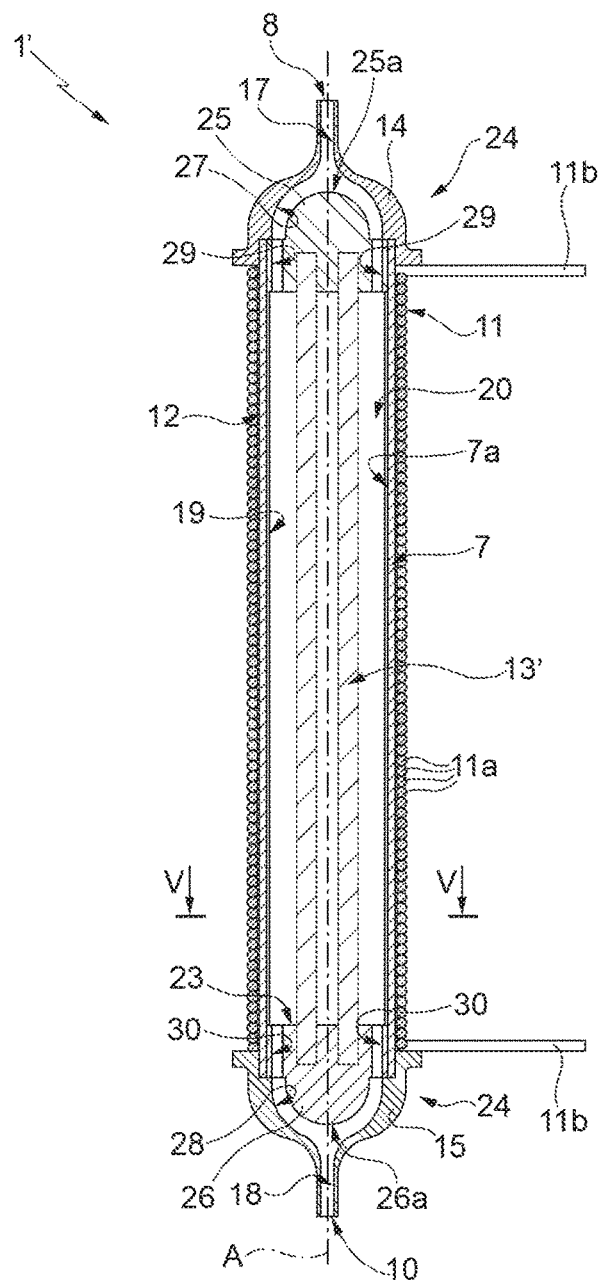
FIG. 4 is analogous to FIG. 2 and shows a corresponding axial section, on an enlarged scale and with parts removed for clarity, of a heater according to a second preferred embodiment of the present invention.
Figure 5:
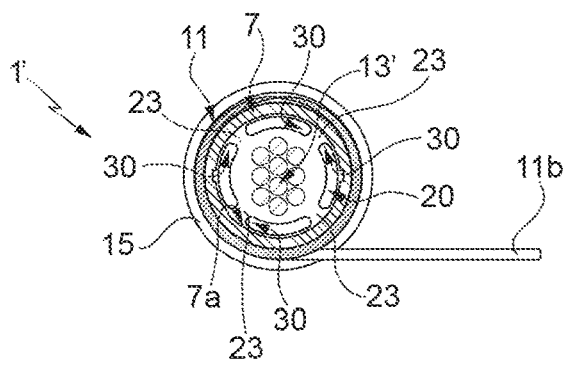
FIG. 5 is analogous to FIG. 3 and shows a corresponding cross-section of the heater shown in FIG. 4.

With reference to FIGS. 4 and 5, a continuous-flow heater realized in accordance with an alternative preferred embodiment of the present invention is indicated as a whole by 1'.

Since the heater 1' is similar by structure and operation to the heater 1, only the structural and functional differences with respect to the latter will be described in the following.

The same references will be used to indicate similar or equivalent parts and/or features.

In particular, the heater 1' differs from the heater 1 in that it is provided with a heating element 13' which comprises, in particular is constituted by, a plurality of bar elements.

More precisely, the heating element 13' is constituted by a bundle of bar elements having a smaller diameter than the diameter of the single bar element forming the heating element 13 of the heating device 1.

In detail, each of the bar elements of the heating element 13' extends axially inside the channel 7a, from the shaped portion 14 to the shaped portion 15.

In greater detail, the bar elements are fixed to such shaped portions 14 and 15 at respective opposite axial end portions of said bar elements.

In use, the flow of water flowing inside the channel 7a laps each of the bar elements, running in the interstices of the channel 7a between the bar elements. The heat transfer is improved as a result, as the total transfer surface of the heating element 13' is greater than that of the heating element 13.

Figure 6:
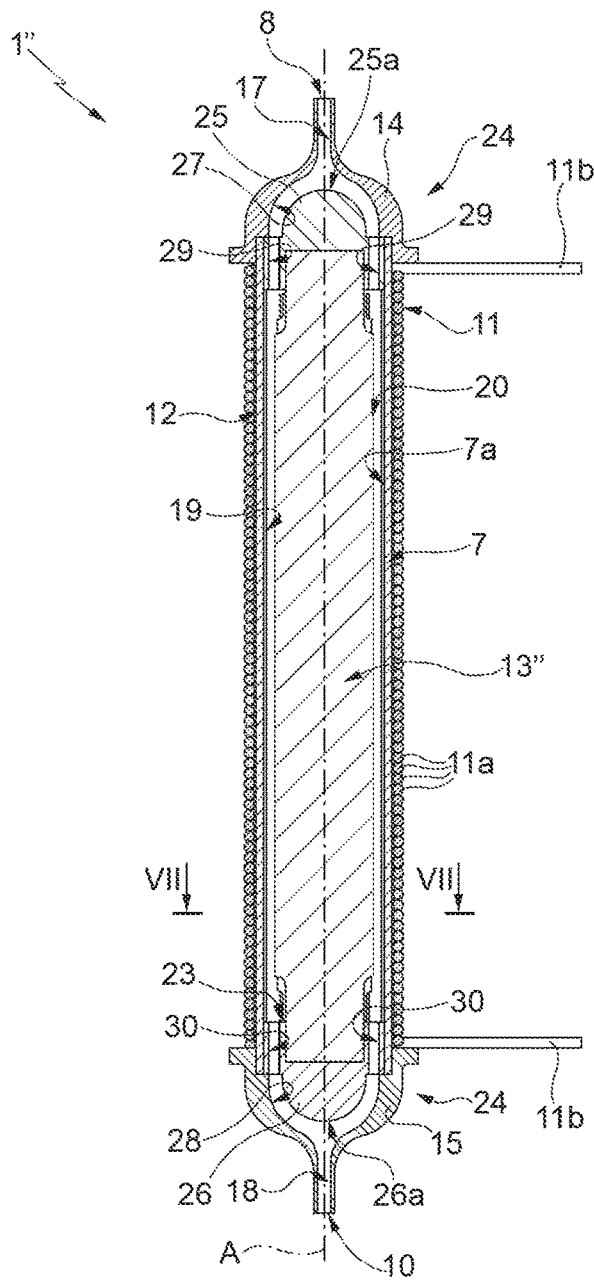
FIG. 6 is analogous to FIG. 2 and shows a corresponding axial section, on an enlarged scale and with parts removed for clarity, of a heater in accordance with a third preferred embodiment of the invention.
Figure 7:
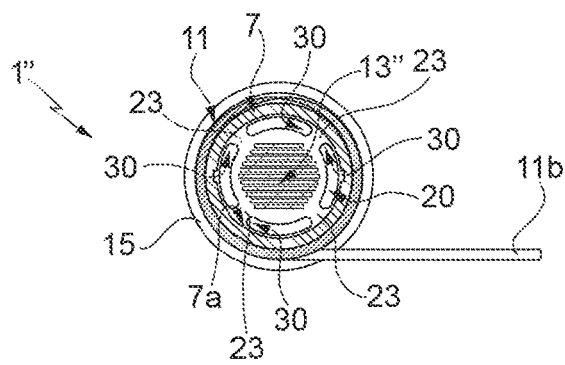
FIG. 7 is analogous to FIG. 3 and shows a corresponding cross-section of the heater shown in FIG. 6.

With reference to FIGS. 6 and 7, a continuous-flow heater realized in accordance with a further preferred embodiment of the present invention is indicated as a whole by 1".

Since the heater 1" is similar by structure and operation to the heater 1, only the structural and functional differences with respect to the latter will be described in the following.

The same references will be used to indicate similar or equivalent parts and/or features.

In particular, the heater 1" differs from the heater 1 in that it is provided with a heating element 13" which comprises, in particular is constituted by, a plurality of thin wall sheets.

Specifically, each of the sheets of the heating element 13" extends axially inside the channel 7a, from the shaped portion 14 to the shaped portion 15.

More specifically, the sheets are fixed to these shaped portions 14 and 15 at respective opposite axial end portions of said sheets.

In use, the flow of water flowing inside the channel 7a laps each of the thin wall sheets, running in the interstices delimited between each pair of sheets. The heat transfer is improved as a result, as the total transfer surface of the heating element 13" is even greater than that of the heating element 13'.

From an examination of the features of the heaters 1, 1', 1" realized in accordance with the present invention, the advantages rendered achievable by the same become evident.

In particular, as a result of the presence of the upstream and downstream baffles 25 and 26, the overall hydrodynamic drag of the heaters 1, 1', 1" is reduced compared to the case where these heaters are not provided with a baffle element. Simultaneously, there is a decrease in the total pressure drop.

Moreover, as a result of the particular form of the upstream and downstream baffles 25 and 26 and of the shaped sections 27 and 28, it is possible to achieve a homogeneous and uniform heating of the water flow.

It is evident that the described and illustrated heaters 1, 1', 1" can be modified and varied without leaving the scope of protection defined by the claims as a result.

In particular, the upstream baffle 25 and the downstream baffle 26 may be integral parts of the heating element 13, 13', 13" and thus be respectively formed by the first and by the second end portion of the heating element 13, 13', 13".

The invention claimed is:

1. A continuous-flow electromagnetic-induction fluid heater for a beverage vending machine;

the continuous-flow electromagnetic-induction fluid heater comprises:

at least one tubular body internally defining at least one channel for a fluid and including at least one inlet opening through which the fluid to be heated is fed, in use, to said channel, and one outlet opening through which the heated fluid flows out, in use, from said channel;

a heating element arranged, at least partially, inside said channel so as to be lapped, in use, by the fluid; and an electric winding wound directly in contact around an external surface of said tubular body and which can be electrically powered to generate an electromagnetic induction field and heat, in this manner, the heating element due to the effect of said electromagnetic induction field;

the continuous-flow electromagnetic-induction fluid heater further comprises an upstream fluid baffle, the upstream fluid baffle being:

housed within said channel in a position fluidically downstream of said inlet opening;

disposed fluidically upstream of said heating element with respect to the direction of the fluid from said inlet opening to said outlet opening;
shaped so as to reduce the hydrodynamic drag on said fluid between said inlet opening and said heating element; and
coupled to, or formed integrally as part of, said heating element, the at least one tubular body comprising:
a first shaped portion internally defining a first shaped section of said channel arranged fluidically downstream of said inlet opening and fluidically upstream of said heating element and facing said upstream baffle; said first shaped section having a profile that follows, at least partially, an external surface of said upstream baffle; and
feeding channels arranged fluidically downstream of said upstream baffle for fluidically connecting said first shaped section-to the remaining section of said channel downstream of said first shaped section and apt to distribute said fluid around said heating element.

2. The continuous-flow electromagnetic-induction fluid heater as claimed in claim 1, further comprising a downstream fluid baffle, which is housed in said channel in a position fluidically downstream of said heating element and fluidically upstream of said outlet opening, with respect to the direction of the fluid from said inlet opening to said outlet opening, and is shaped so as to reduce the hydrodynamic drag on the fluid between said heating element and said outlet opening.

3. The continuous-flow electromagnetic-induction fluid heater as claimed in claim 2, wherein said downstream baffle is coupled to, or forms integrally part of, said heating element.

4. The continuous-flow electromagnetic-induction fluid heater as claimed in claim 3, wherein said downstream baffle is mounted at, or is defined by, a second end portion of said heating element, opposite to a first end portion, and arranged at said outlet opening.

5. The continuous-flow electromagnetic-induction fluid heater as claimed in claim 2, wherein said tubular body comprises a second shaped portion internally defining a second shaped section of said channel arranged fluidically downstream of said heating element and fluidically upstream of said outlet opening and facing said downstream baffle; said second shaped section having a profile that follows, at least partially, an external surface of said downstream baffle.

6. The continuous-flow electromagnetic-induction fluid heater as claimed in claim 1, wherein said tubular body has a longitudinal axis; said inlet opening, said outlet opening and said upstream baffle and a downstream baffle are arranged coaxially to said axis.

7. The continuous-flow electromagnetic-induction fluid heater as claimed in claim 1, wherein said heating element is selected from one of the following configurations:
a bar element having a substantially circular-shaped cross-section;
a plurality of bar elements having corresponding substantially circular-shaped cross-sections; and
a plurality of thin wall sheets.

8. A beverage vending machine comprising:
a continuous-flow electromagnetic-induction fluid heater as claimed in claim 1;
a fluid supply circuit fluidically connected to said continuous-flow electromagnetic-induction fluid heater for supplying it with a fluid; and
an electric power supply circuit electrically connected to said electrical winding to electrically power it.

9. A continuous-flow electromagnetic-induction fluid heater for a beverage vending machine;
the continuous-flow electromagnetic-induction fluid heater comprises:
at least one tubular body internally defining at least one channel for a fluid and including at least one inlet opening through which the fluid to be heated is fed, in use, to said channel, and one outlet opening through which the heated fluid flows out, in use, from said channel;
a heating element arranged, at least partially, inside said channel so as to be lapped, in use, by the fluid; and
an electric winding wound directly in contact around an external surface of said tubular body and which can be electrically powered to generate an electromagnetic induction field and heat, in this manner, the heating element due to the effect of said electromagnetic induction field;
the continuous-flow electromagnetic-induction fluid heater further comprises an upstream fluid baffle, the upstream fluid baffle being:
housed within said channel in a position fluidically downstream of said inlet opening;
disposed fluidically upstream of said heating element with respect to the direction of the fluid from said inlet opening to said outlet opening;
shaped so as to reduce the hydrodynamic drag on said fluid between said inlet opening and said heating element;
and
mounted at, or is defined by, a first end portion of said heating element arranged at said inlet opening, the at least one tubular body comprising:
a first shaped portion internally defining a first shaped section of said channel arranged fluidically downstream of said inlet opening and fluidically upstream of said heating element and facing said upstream baffle; said first shaped section having a profile that follows, at least partially, an external surface of said upstream baffle; and
feeding channels arranged fluidically downstream of said upstream baffle for fluidically connecting said first shaped section to the remaining section of said channel downstream of said first shaped section and apt to distribute said fluid around said heating element.

10. The continuous-flow electromagnetic-induction fluid heater as claimed in claim 9, wherein said heating element is selected from one of the following configurations:
a bar element having a substantially circular-shaped cross-section;
a plurality of bar elements having corresponding substantially circular-shaped cross-sections; and
a plurality of thin wall sheets.

11. A beverage vending machine comprising:
a continuous-flow electromagnetic-induction fluid heater as claimed in claim 9;
a fluid supply circuit fluidically connected to said continuous-flow electromagnetic-induction fluid heater for supplying it with a fluid; and
an electric power supply circuit electrically connected to said electrical winding to electrically power it.

* * * * *